United States Patent
Yu et al.

(10) Patent No.: US 10,987,665 B2
(45) Date of Patent: Apr. 27, 2021

(54) BIFUNCTIONAL ABSORPTIVE MATERIAL CAPABLE OF ABSORBING BOTH CATIONS AND ANIONS IN AQUEOUS PHASE

(71) Applicant: FUZHOU UNIVERSITY, FUZHOU (CN)

(72) Inventors: Yan Yu, Fuzhou (CN); Yajun He, Fuzhou (CN); Qiuping Wu, Fuzhou (CN); Zhiyu Liang, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 1214 days.

(21) Appl. No.: 14/826,167

(22) Filed: Aug. 13, 2015

(65) Prior Publication Data
US 2021/0008538 A1    Jan. 14, 2021

(30) Foreign Application Priority Data
Jan. 22, 2015    (CN) .......................... 201510032257.X

(51) Int. Cl.
| | | |
|---|---|---|
| *C07F 5/06* | (2006.01) | |
| *C07F 7/02* | (2006.01) | |
| *B01J 20/26* | (2006.01) | |
| *B01J 43/00* | (2006.01) | |
| *C02F 1/28* | (2006.01) | |
| *C08G 65/336* | (2006.01) | |

(52) U.S. Cl.
CPC .................. *B01J 43/00* (2013.01); *C02F 1/28* (2013.01); *C08G 65/336* (2013.01)

(58) Field of Classification Search
CPC ... C07F 5/06; C07F 7/02; B01J 20/223; C02F 1/28
USPC .................................. 544/181; 502/232, 167
See application file for complete search history.

(56) References Cited

PUBLICATIONS

Wu et al. : Simultaneous removal of cations and anions from waste water by bifunctional mesoporous silica. Applied Surface Science, vol. 351, pp. 155-163, 2015.*

* cited by examiner

*Primary Examiner* — Charanjit Aulakh
(74) *Attorney, Agent, or Firm* — Luoh J. Wu; Continent Patent Office LLP

(57) ABSTRACT

This present invention discloses a bifunctional adsorptive material capable of adsorbing both cations and anions in aqueous phase, obtainable by synthesizing aluminum ion doped SBA-15 molecular sieves from P123 triblock copolymers, tetraethoxysilane, and aluminum isopropoxide to obtain multiple cationic active adsorption sites, and by grafting large sterically hindered organic groups onto the surface of Al-SBA-15 to obtain multiple anionic active adsorption sites. This kind of adsorptive material has two types of adsorption sites for ions of opposite charges. The large sterically hindered organic groups prevent spontaneous recombination reaction between the two types of adsorption sites, enabling the adsorptive material to have excellent adsorption capacity for wastewater treatment involving both cations and anions.

4 Claims, 1 Drawing Sheet

BIFUNCTIONAL ABSORPTIVE MATERIAL CAPABLE OF ABSORBING BOTH CATIONS AND ANIONS IN AQUEOUS PHASE

CROSS-REFERENCE TO RELATED APPLICATIONS

This application is a continuation of International Application No. 201510032257.X, filed Jan. 22, 2015.

BACKGROUND OF THE INVENTION

This present invention, wherein a bifunctional adsorptive material capable of adsorbing both cations and anions in aqueous phase and a preparation method thereof are disclosed, belongs to the field of sewage treatment.

In recent years, a growing number of the world's rivers, lakes, and groundwater aquifers have been severely contaminated by industrial pollutants, seriously impacting the environmental safety. Among various methods for environmental remediation, adsorption technique is widely used and most effective. For the treatment of wastewater containing soluble inorganic contaminants, existing adsorption methods typically involve separate steps where ions of opposite charges are removed by separate types of adsorptive materials. For example, the adsorptive materials with multiple acidic sites are used to adsorb cations, while the adsorptive materials with multiple basic sites are used to adsorb anions. Such stepwise methods are clearly not very effective even for a simple water treatment system, let alone for the treatment of water contaminated by diversified ions. Moreover, it is very difficult to achieve excellent purification result with such stepwise methods because the factors such as humic acid concentration, pH value, ionic strength, temperature and dissolved oxygen cycle can cause charge transfer, hydrogen bonding and hydrophobic effect to occur among different ions and groups, leading to phenomena including adsorption, complexation, desorption and migration and transport of ions on adsorptive materials. Furthermore, such methods are cost ineffective and time consuming because the adsorption, separation and recovery treatments must be carried out in steps. Therefore, materials with multiple cation and anion adsorption sites offer better purification solutions for the treatment of wastewater containing inorganic pollutants.

Mesoporous molecular sieve (SBA-15) provides an ideal matrix for bifunctional adsorptive material due to its large surface area, uniform pore size, stable framework, easy for doping and surface modification. This present invention takes the advantages of the properties of SBA-15, dope it with Al-ion to obtain multiple cationic active adsorption sites, and graft large sterically hindered organic groups onto its surface to create multiple anionic active adsorption sites. The invented material is thus capable of adsorbing both cations and anions. The large sterically hindered organic groups prevent spontaneous recombination reaction between the two types of adsorption sites, thereby enabling the adsorptive material to have excellent adsorption capacity for wastewater with both cations and anions.

BRIEF SUMMARY OF THE INVENTION

The present invention aims at developing a kind of bifunctional adsorptive material capable of adsorbing both cations and anions in aqueous phase and a preparation method thereof to overcome the disadvantages of the prior art. The conventional adsorptive materials can only treat cations and anions stepwise, whereas a bifunctional adsorptive material can adsorb both cations and anions and is a low-cost, more effective material.

Thus, what is disclosed here is a bifunctional adsorptive material capable of adsorbing both cations and anions in aqueous phase, obtainable by a process comprising the steps of synthesizing aluminum-ion doped SBA-15 molecular sieves (Al-SBA-15) using P123 triblock copolymers, tetraethoxysilane and aluminum isopropoxide as raw materials to obtain multiple cationic active adsorption sites, and grafting large sterically hindered organic groups onto the surface of Al-SBA-15 to obtain multiple anionic active adsorption sites. During the synthesis of aluminum-ion doped SBA-15 molecular sieves (Al-SBA-15), the ratio of silicon to aluminum is 10. During the step of grafting large sterically hindered organic groups onto Al-SBA-15, the grafting amount is 0.05 mmol/g.

More specifically, the Al-SBA-15 synthesis step is carried out in the following procedure:

(a) dissolving P123 triblock copolymer in an appropriate amount of deionized water and a 2M HCl solution, stirring the solution for 4 hours under room temperature to ensure that the copolymer be completely dissolved, adding tetraethoxysilane to the solution gradually under the temperature of 40° C., vigorously stirring the mixture for 45 minutes, adding isopropanol aluminum to the mixture gradually, and vigorously stirring for 24 hours to obtain a gel mixture;

(b) crystallizing the gel mixture from the previous sub-step under 100° C. for 48 hours in a Teflon-lined autoclave;

(c) filtering the crystallized product from the previous sub-step, rinsing the solids obtained from filtration with deionized water until neutral, and drying the solids under the temperature of 60° C. for 12 hours, and calcining the solids under 550° C. for 6 hours with a heating rate of 2° C. per minute to obtain Al-SBA-15.

The synthesis of the bifunctional adsorptive material is carried out in the following procedure:

(a) dissolving the Al-SBA-15 from the previous step in anhydrous toluene, adding 3-aminopropyltriethoxysilane to the mixture gradually, stirring the mixture for 12 hours under room temperature, then filtering the mixture, rinsing the solids from filtration with isopropanol, and drying the solids under the temperature of 110° C. to obtain Al-SBA-15-NH$_2$;

(b) dissolving cyanuric chloride and N,N-diisopropylethylamine in anhydrous tetrahydrofuran, stirring the mixture for 3 hours under the temperature of 0° C., then adding the Al-SBA-15-NH$_2$ prepared from sub-step (2a) to the mixture, stilling the mixture for 24 hours under the temperature of 0° C., filtering the mixture, and rinsing the solids from filtration with methanol, dichloromethane, and tetrahydrofuran respectively;

(c) dissolving the solids from sub-step (2b) and ethanediamine in anhydrous tetrahydrofuran, refluxing reaction for 24 hours, filtering the product, rinsing the solids from filtration with methanol, dichloromethane, and tetrahydrofuran respectively, drying the solids, and then pouring the solids into a 0.1 M HCl solution, stilling the mixture for 6 hours, filtering the product, and drying the solids to obtain bifunctional adsorptive material.

The entire synthesis process is illustrated below:
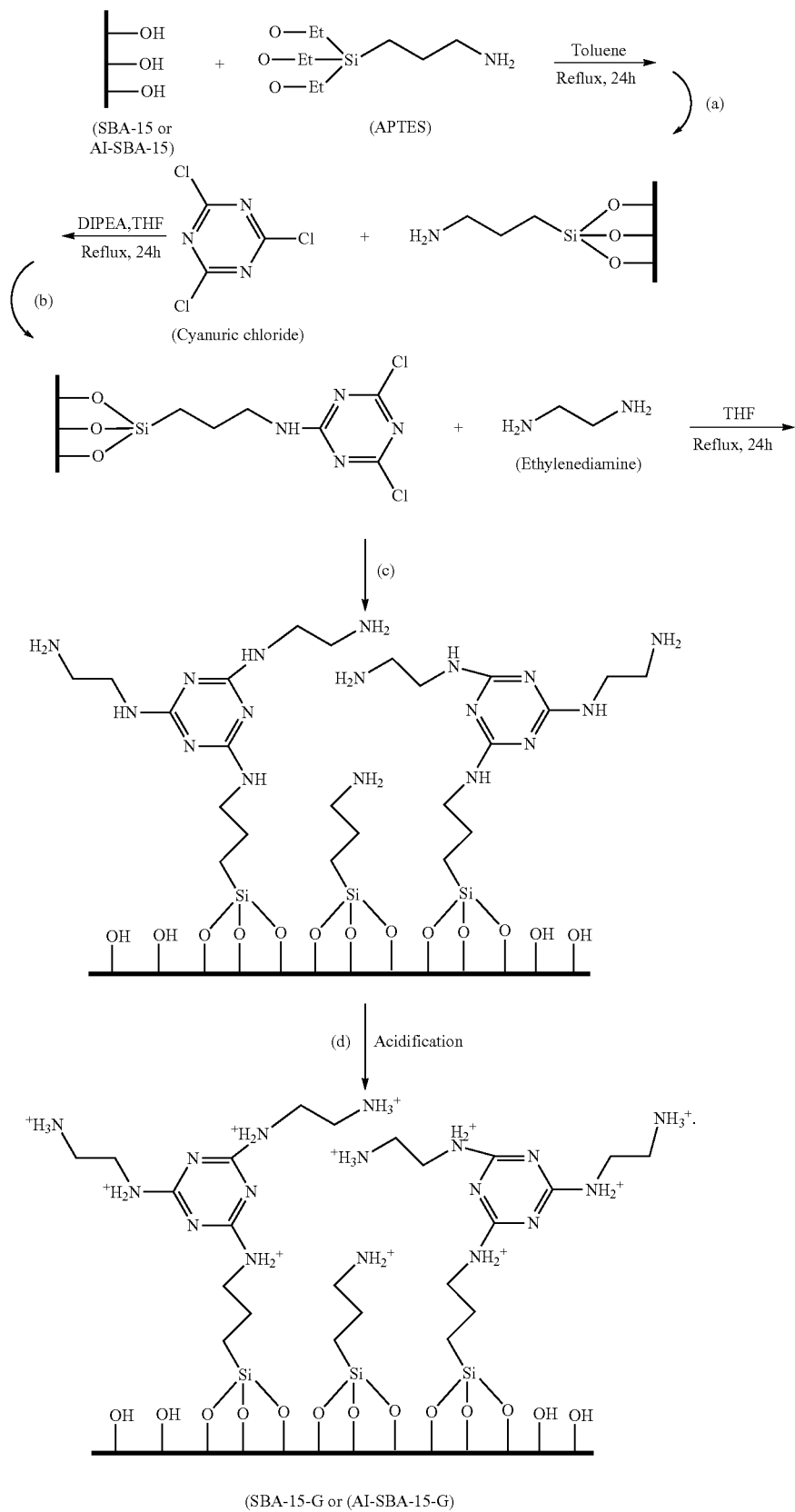
(SBA-15-G or (AI-SBA-15-G)

The present invention offers the following significant advantages:

(1) Doping SBA-15 with aluminum ions creates multiple cationic active adsorption sites. The doping amount affects the framework-ordering and cation adsorption capacity. Excessive doping amount will overly alter the framework ordering of SBA-15, which will negatively affect the subsequent grafting of the large sterically hindered organic groups onto the surface of Al-SBA-15. Insufficient doping, on the other hand, will obviously lead to insufficient number of cationic active adsorption sites being created for an effective adsorption of cations. An optimum doping ratio of silicon to aluminum is about 10 as determined by the present inventors.

(2) It has been further discovered that the grafting amount of large sterically hindered organic groups significantly affects the pore size, pore volume, and specific surface area of Al-SBA-15. Too large a grafting amount decreases the specific surface area, causes pore clogging and damages to the structure of Al-SBA-15, and can lead to spontaneous recombination and neutralization reactions between cationic and anionic adsorption sites, which will result in low co-adsorption of cations and anions. Too small a grafting amount will result in insufficient anionic active adsorption sites being created for an effective anion adsorption. An optimum grafting amount of large sterically hindered organic groups is 0.05 mmol/g.

(3) For a bifunctional adsorptive material capable of adsorbing both cations and anions in aqueous phase as disclosed herein, the large sterically hindered organic groups prevent spontaneous recombination and neutralization reactions between the two types adsorption sites, thereby enabling the adsorptive material to have excellent adsorption capacity for both cations and anions, especially for the treatment of wastewater.

BRIEF DESCRIPTION OF THE DRAWINGS

The drawings included herein are for the purpose of illustrating the exemplified embodiments and shall not limit the scope of the present invention. Other drawings may be produced by those skilled in the art without creative efforts.

DETAILED DESCRIPTION OF THE INVENTION

Figure 1A:
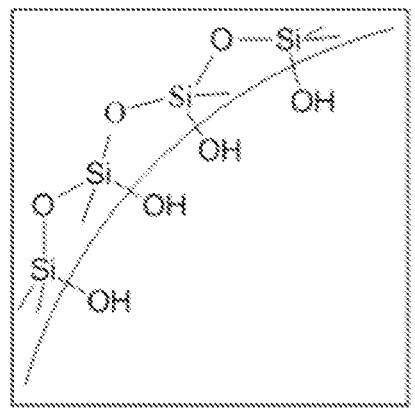
FIG. 1(a) is a schematic view of the structure of SBA-15 in an embodiment of the present application.
Figure 1B:
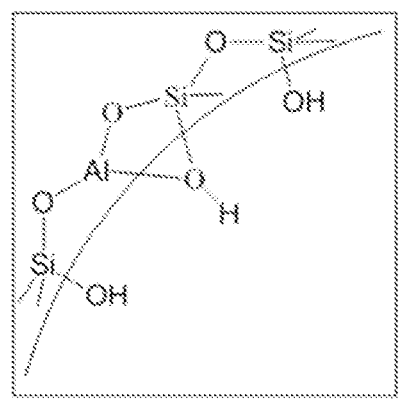
FIG. 1(b) is a schematic view of the structure of Al-SBA-15 in an embodiment of the present application.

The present invention is further described in the following exemplified embodiment to illustrate the application of the principles of the invention. It is understood that the invention may be embodied otherwise without departing from such principles. The scope of the claims of the present invention expressly should not be limited to such exemplary or preferred embodiments.

Embodiment 1

This embodiment describes a process for preparing a bifunctional adsorptive material capable of adsorbing both cations and anions in aqueous phase, comprising the following steps:

Step 1: synthesizing Al-SBA-15, which comprises the following sub-steps:

(1a) dissolving 4 g of P123 triblock copolymer in 30 mL of deionized water and 120 mL of 2M HCl solution, stirring the solution for 4 hours under room temperature to ensure that the copolymer be completely dissolved, adding 9.0 g of tetraethoxysilane to the solution gradually under the temperature of 40° C., vigorously stilling the mixture for 45 minutes, adding 0.8333 g of isopropanol aluminum to the mixture gradually, and vigorously stirring for 24 hours to obtain a gel mixture;

(1b) crystallizing the gel mixture from the previous sub-step under 100° C. for 48 hours in a Teflon-lined autoclave;

(1c) filtering the crystallized product from the previous sub-step, rinsing the solids obtained from filtration with deionized water until neutral, drying the solids under 60° C. for 12 hours, and calcining the solids under 550° C. for 6 hours with a heating rate of 2° C. per minute to obtain Al-SBA-15;

Step 2: synthesizing bifunctional adsorptive material by grafting large sterically hindered organic groups onto the surface of Al-SBA-15, which comprises the following sub-steps:

(2a) dissolving 1 g of Al-SBA-15 from step 1 in 100 mL of anhydrous toluene, adding 0.05 mmol of 3-aminopropyltriethoxysilane to the mixture gradually, stilling the mixture for 12 hours under room temperature, then filtering the mixture, rinsing the solids from filtration with isopropanol, and drying the solids under 110° C. to obtain Al-SBA-15-NH2;

(2b) dissolving 5.5 g of cyanuric chloride and 7.1 mL of N,N-diisopropylethylamine in 300 mL of anhydrous tetrahydrofuran, stirring the mixture for 3 hours under 0° C.; then adding 1 g of Al-SBA-15-NH2 prepared from sub-step (2a) to the mixture, stir the mixture for 24 hours under 0° C., filtering the mixture, and rinsing the solids from filtration with methanol, dichloromethane, and tetrahydrofuran respectively;

(2c) dissolving the solids from sub-step (2b) and 4 mL of ethanediamine in 300 mL of anhydrous tetrahydrofuran, refluxing the reaction for 24 hours, filtering the product, rinsing the solids from filtration with methanol, dichloromethane and tetrahydrofuran respectively, drying the solids, and then pouring the solids into 200 mL of 0.1 M HCl solution, stilling the mixture for 6 hours, filtering the product, and drying the solids to obtain bifunctional adsorptive material (Al-SBA-15-G).

Figure 2:
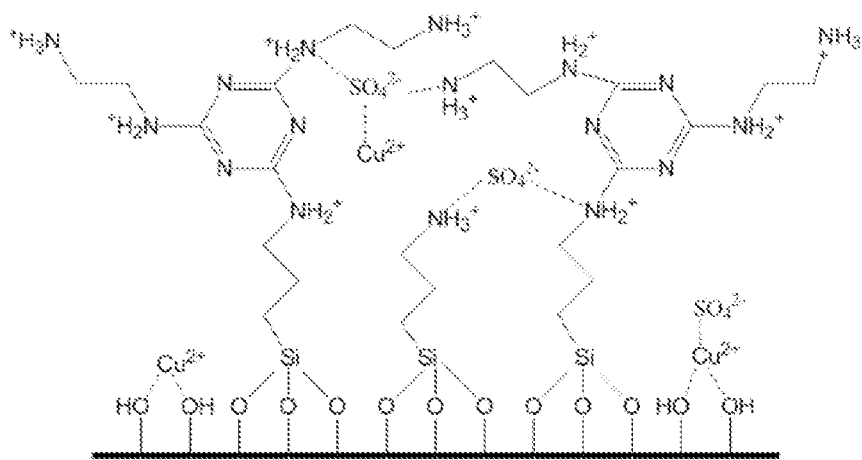
FIG. 2 is an adsorption diagram showing the mechanism of the bifunctional adsorptive material (Al-SBA-15-G) in aqueous phase.

To test and evaluate the co-adsorption efficiency of Al-SBA-15-G of cations and anions, $CuSO_4$ and $Na_2SO_4$ are used as raw materials to prepare an artificial (simulated) wastewater blended with $Cu^{2+}$ and $(SO_4)^{2-}$. The adsorption mechanism is shown in FIG. 2.

Determination of adsorption time: the ratio of silicon to aluminum was 10 for Al-SBA-15; the grafting amount of large sterically hindered organic groups was 0.05 mmol/g for Al-SBA-15-G. The pH value and concentration of the wastewater were 7 and 30 mg/L respectively. The co-adsorption effect of Al-SBA-15-G was evaluated at various adsorption time. The testing results are shown in Table 1.

TABLE 1

The effect of adsorption time on the co-adsorption efficiencies

| Adsorption time (min) | 5 | 10 | 15 | 20 | 30 | 60 | 90 | 120 | 150 | 180 |
|---|---|---|---|---|---|---|---|---|---|---|
| Adsorption efficiency of $Cu^{2+}$ (%) | 42 | 50 | 59 | 62 | 78 | 89 | 96 | 95 | 96 | 96 |
| Adsorption efficiency of $(SO_4)^{2-}$ (%) | 39 | 48 | 50 | 59 | 69 | 83 | 95 | 95 | 95 | 95 |

As shown in Table 1, the optimum time for adsorbing both $Cu^{2+}$ and $(SO_4)^{2-}$ is 90 min for the given test.

Determination of pH value: The doping ratio of silicon to aluminum was 10 for Al-SBA-15 and the grafting amount of large sterically hindered organic groups was 0.05 mmol/g for Al-SBA-15-G. The concentration of the wastewater was 30 mg/L. The adsorption time was set at 90 minutes. The co-adsorption effect of Al-SBA-15-G was evaluated for various pH values. The testing results are shown in Table 2.

TABLE 2

The effects of pH value on the co-adsorption efficiencies

| pH value | 2 | 3 | 4 | 5 | 6 | 7 | 8 | 9 | 10 | 11 |
|---|---|---|---|---|---|---|---|---|---|---|
| Adsorption efficiency of $Cu^{2+}$ (%) | 42 | 59 | 62 | 78 | 89 | 96 | 95 | 96 | 96 | 96 |
| Adsorption efficiency of $(SO_4)^{2-}$ (%) | 95 | 95 | 95 | 95 | 95 | 95 | 82 | 80 | 73 | 35 |

As shown in Table 2, that adsorption efficiency of both $Cu^{2+}$ and $(SO_4)^{2-}$ reach the maximum when the pH value is 7 for the given test.

Determination of the ratio of silicon to aluminum: The co-adsorption effect of Al-SBA-15-G was evaluated for 5 different Si/Al ratios with the amount of isopropanol aluminum added during doping being set at 1.6666 g (Si/Al=5), 0.8333 g (Si/Al=10), 0.5555 g (Si/Al=15), 0.4167 g (Si/Al=20), 0.2778 g (Si/Al=30), respectively. The grafting amount of large sterically hindered organic groups was fixed at 0.05 mmol/g for Al-SBA-15-G. The pH value and concentration of the wastewater were fixed at 7 and 30 mg/L, respectively. The adsorption time was 90 min. The testing results are shown in Table 3.

TABLE 3

The effect of the ratio of silicon-aluminum on the co-adsorption efficiencies

| the ratio of silicon-aluminum | 5 | 10 | 15 | 20 | 30 |
|---|---|---|---|---|---|
| Adsorption efficiency of $Cu^{2+}$ (%) | 60 | 96 | 80 | 76 | 62 |
| Adsorption efficiency of $(SO_4)^{2-}$ (%) | 65 | 97 | 96 | 96 | 97 |

As shown in Table 3, that adsorption efficiency of both $Cu^{2+}$ and $(SO_4)^{2-}$ reach maximum when the ratio of silicon to aluminum is 10.

Determination of the grafting amount of organic groups: the ratio of silicon to aluminum was fixed at 10 for Al-SBA-15. The pH value and concentration of the blend wastewater were 7 and 30 mg/L, respectively. The adsorption time was 90 min. The co-adsorption effect of Al-SBA-15-G was evaluated by varying the grafting amount of large sterically hindered organic groups. The testing results are shown in Table 4.

TABLE 4

The effect of grafting amount of organic groups on the co-adsorption efficiencies

| | grafting amount of organic groups (mmol/g) | | | | | |
|---|---|---|---|---|---|---|
| | 0.02 | 0.04 | 0.05 | 0.06 | 0.08 | 1.0 |
| Adsorption efficiency of $Cu^{2+}$ (%) | 94 | 95 | 95 | 95 | 92 | 85 |
| Adsorption efficiency of $(SO_4)^{2-}$ (%) | 62 | 83 | 97 | 90 | 81 | 76 |

As shown in Table 4, that adsorption efficiency of both $Cu^{2+}$ and $(SO_4)^{2-}$ reach maximum when the grafting amount of organic groups is 0.05 mmol/g.

The bifunctional adsorptive material disclosed herein is capable of adsorbing both cations and anions in aqueous phase. The large sterically hindered organic groups prevent spontaneous recombination and neutralization reaction between the two types of adsorption sites. As such, the adsorptive material has excellent adsorption capacity for both cations and anions for the treatment of wastewater. The test data demonstrated that the adsorption rates for $Cu^{2+}$ and $(SO_4)^{2-}$ can reach up to 95%, which suggests great potential for wastewater treatment applications.

What is claimed is:

1. A bifunctional adsorptive material capable of adsorbing both cations and anions in aqueous phase, obtainable by a process comprising the steps of:
   synthesizing aluminum-ion doped SBA-15 molecular sieves (Al-SBA-15) by using P123 triblock copolymers, tetraethoxysilane, and aluminum isopropoxide as raw materials to obtain multiple cationic active adsorption sites;
   grafting large sterically hindered organic groups onto the surface of Al-SBA-15 to obtain multiple anionic active adsorption sites.

2. A process for preparing a bifunctional adsorptive material capable of adsorbing both cations and anions in aqueous phase as claimed in claim 1, comprising the following detailed steps:
   Step 1: synthesizing Al-SBA-15, which comprises the following sub-steps:
   (1a) dissolving P123 triblock copolymer in an appropriate amount of deionized water and a 2M HCl solution, stirring the solution for 4 hours under room temperature to ensure that the copolymer be completely dissolved, adding tetraethoxysilane to the solution gradually under the temperature of 40° C., vigorously stirring the mixture for 45 minutes, adding isopropanol aluminum to the mixture gradually, and vigorously stilling for 24 hours to obtain a gel mixture;
   (1b) crystallizing the gel mixture obtained from (1a) under 100° C. for 48 hours in a Teflon-lined autoclave;
   (1c) filtering the crystallized product obtained from (1b), rinsing the solids obtained from filtration with deionized water until neutral, drying the solids under the temperature of 60° C. for 12 hours, and calcining the solids under 550° C. for 6 hours with a heating rate of 2° C. per minute to obtain Al-SBA-15.

Step 2: synthesizing bifunctional adsorptive material by grafting large sterically hindered organic groups onto the surface of Al-SBA-15, which comprises the following sub-steps:

(2a) dissolving the Al-SBA-15 prepared from step 1 in anhydrous toluene, adding 3-aminopropyltriethoxysilane to the mixture gradually, stirring the mixture for 12 hours under room temperature, then filtering the mixture, rinsing the solids from filtration with isopropanol, and drying the solids under the temperature of 110° C. to obtain Al-SBA-15-NH$_2$;

(2b) dissolving cyanuric chloride and N,N-diisopropylethylamine in anhydrous tetrahydrofuran, stirring the mixture for 3 hours under the temperature of 0° C.; then adding the Al-SBA-15-NH$_2$ prepared from sub-step (2a) to the mixture, stilling the mixture for 24 hours under the temperature of 0° C., filtering the mixture, and rinsing the solids from filtration with methanol, dichloromethane, and tetrahydrofuran respectively;

(2c) dissolving the solids from sub-step (2b) and ethanediamine in anhydrous tetrahydrofuran; refluxing the reaction for 24 hours; filtering the product; rinsing the solids from filtration with methanol, dichloromethane, and tetrahydrofuran respectively; drying the solids, and then pouring the solids into a 0.1 M HCl solution; stilling the mixture for 6 hours; filtering the product; and drying the solids to obtain the bifunctional adsorptive material.

3. The material as claimed in claim 1 or 2, wherein the ratio of silicon-aluminum is 10 when aluminum-ion doped SBA-15 molecular sieves (Al-SBA-15) is synthesized.

4. The material as claimed in claim 1 or 2, wherein the grafting amount is 0.05 mmol/g in the grafting step wherein large sterically hindered organic groups are grafted onto Al-SBA-15.

* * * * *